(12) United States Patent
Yamrom et al.

(10) Patent No.: US 6,306,092 B1
(45) Date of Patent: Oct. 23, 2001

(54) METHOD AND APPARATUS FOR CALIBRATING ROTATIONAL OFFSETS IN ULTRASOUND TRANSDUCER SCANS

(75) Inventors: Boris Yamrom; William Thomas Hatfield, both of Schenectady; Joseph Edward Piel, Jr., Scotia; Ricardo Scott Avila, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/395,273

(22) Filed: Sep. 13, 1999

(51) Int. Cl.$^7$ .............................. A61B 8/00; H04R 17/00
(52) U.S. Cl. ........................ 600/447; 128/916; 29/25.35
(58) Field of Search .......................... 600/437, 443–447, 600/454–456; 128/916; 73/625–626; 367/7, 11

(56) References Cited
U.S. PATENT DOCUMENTS

| | | | |
|---|---|---|---|
| 4,209,022 | * 6/1980 | Dory | 73/626 |
| 4,431,007 | * 2/1984 | Amazeen et al. | 73/626 |
| 5,454,371 | * 10/1995 | Fenster et al. | 128/916 |
| 5,538,004 | * 7/1996 | Bamber | 128/916 |
| 5,724,978 | * 3/1998 | Tenhoff | 128/916 |

* cited by examiner

Primary Examiner—Francis J. Jaworski
(74) Attorney, Agent, or Firm—Jill M. Breedlove; Douglas E. Stoner (57) ABSTRACT

The axis of rotational transducer array scans, because of imperfect transducer array assembly, may have two orthogonal offsets relative to the geometric center of the transducer array. Without knowledge of these offsets, it is not possible to convert rotational transducer scan data into a rectilinear (Euclidean) coordinate system, as is necessary for three-dimensional processing. Using spatial coherency between appropriate scan lines in different rotational transducer scans, the horizontal and vertical rotational offsets are calculated. These offsets are then utilized in converting the data to a rectilinear coordinate system for three-dimensional processing.

18 Claims, 11 Drawing Sheets

METHOD AND APPARATUS FOR CALIBRATING ROTATIONAL OFFSETS IN ULTRASOUND TRANSDUCER SCANS

FIELD OF THE INVENTION

This invention generally relates to three-dimensional ultrasound imaging of the human anatomy for the purpose of medical diagnosis. In particular, the invention relates to methods and apparatus for three-dimensional imaging of the human anatomy by detecting the ultrasonic echoes reflected from a scanned volume in a human body.

BACKGROUND OF THE INVENTION

Three-dimensional visualization has gained popularity in medical applications since the introduction of computer tomography (CT) in the field several decades ago. For example, three-dimensional visualization is also used in magnetic resonance (MR) imaging. Using three-dimensional data sets in ultrasound imaging is not as popular due to two major obstacles: first, data in most cases are acquired by free-hand B-mode scans that do not provide sufficiently accurate information to enable precise positioning of individual two-dimensional scans (slices) into a common three-dimensional coordinate space; second, the ultrasound data are inherently more noisy than CT and MR data sets, and therefore traditional surface visualization techniques do not produce good results. The last decade has brought many advances in technology, in both hardware and software, that allow for real-time three-dimensional data set visualization using so-called volume rendering that goes directly from a three-dimensional data set into a two-dimensional image display, bypassing the creation of surfaces. One volume rendering technique is known as maximum intensity projection (MIP). The MIP technique involves projection of three-dimensional data intensity values onto a two-dimensional image plane by assigning to each image pixel the maximum intensity value in the three-dimensional data volume that belongs to the line of sight that goes from the eye point through this pixel and into the volume. This method, in combination with animation, can produce true three-dimensional impressions on the monitor. A more computationally demanding technique is known as compositing. This technique involves modeling of a physical phenomenon of light propagation in semi-translucent/semi-opaque media that is recreated from a three-dimensional data set with the addition of specially designed transfer functions.

Some medical applications involve acquiring three-dimensional volume data by a transducer that rotates around an axis orthogonal to the transducer array. The volume "swept" by these two-dimensional B-mode scans represents a cylinder. Since the two-dimensional scans do not lie parallel to each other, it is difficult to visualize three-dimensional object structures from individual scans alone and a volume visualization technique would be desirable. Contemporary software and hardware are efficient in volume rendering techniques, but require that the data be represented as a rectilinear three-dimensional data array. Therefore, conversion from a cylindrical coordinate system to a rectilinear coordinate system is required. Although this conversion is not difficult to compute, an important practical complication to the conversion process is that there is always some offset of the axis of rotation relative to the sensor array middle point. Need exists for a method of calculating this offset based on one three-dimensional volume scan. The offset information computed can be used in an algorithm to convert from a cylindrical coordinate system to a rectilinear one and also can be used in the transducer manufacturing process to position a transducer array exactly at the rotational axis.

SUMMARY OF THE INVENTION

Due to imperfections of transducer assembly, the axis of rotation of a rotational transducer may have two orthogonal offsets relative to the geometric center of transducer array. Without knowing these offsets, it is not possible to convert rotational transducer scan data into a rectilinear (Euclidean) coordinate system, as is necessary for three-dimensional processing and analysis, such as volume visualization. In a preferred embodiment of the invention, the offsets can be calculated based on one three-dimensional volume scan. Using spatial coherency between appropriate scan lines in different transducer scans, the horizontal and vertical rotational offsets are calculated. The computed offset information can be used in an algorithm to convert from a cylindrical to a rectilinear coordinate system for three-dimensional processing and can also be used in the transducer manufacturing process to position the center point of a transducer array exactly at its axis of rotation.

DETAILED DESCRIPTION OF THE PREFERRED EMBODIMENTS

Figure 1:
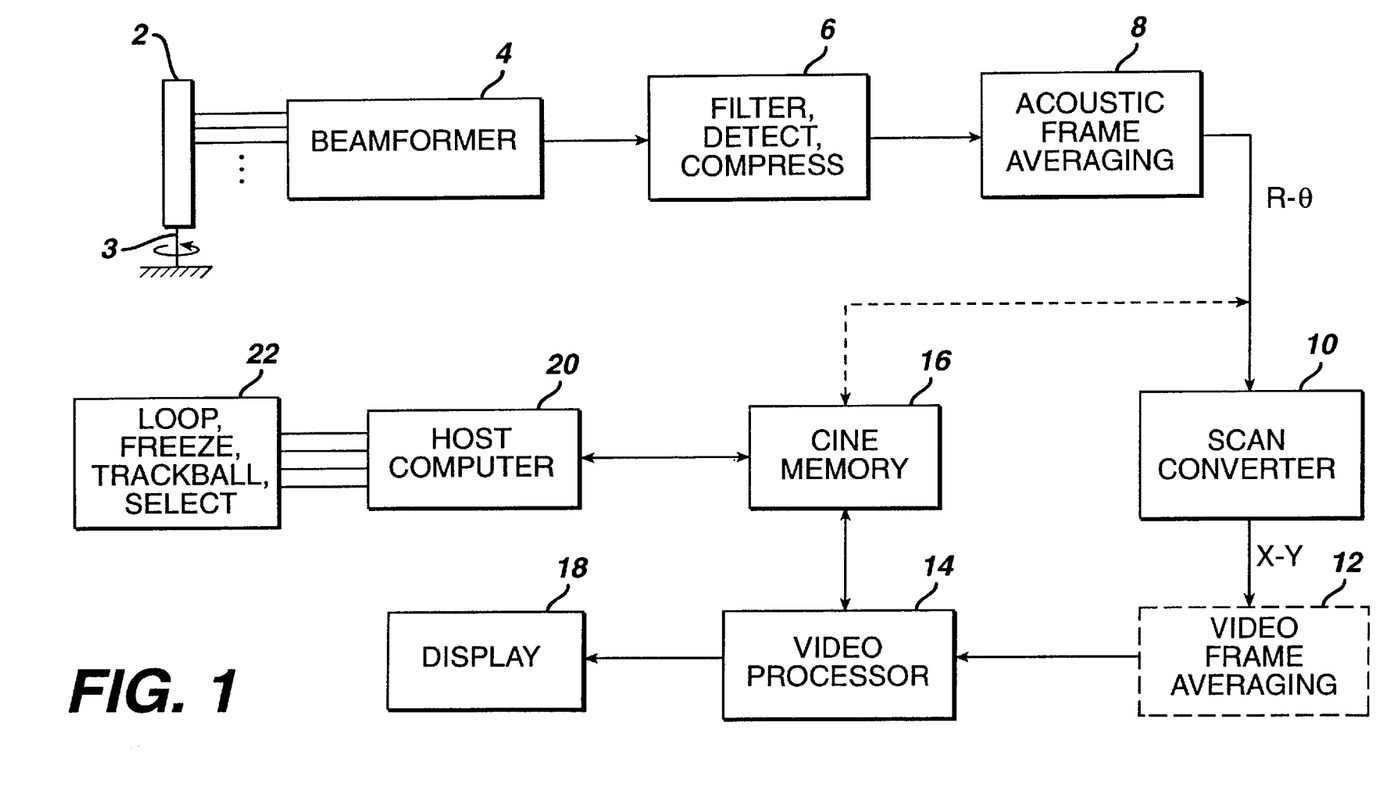
FIG. 1 is a block diagram generally depicting various subsystems of a conventional real-time digital ultrasound imaging system.

The basic signal processing chain in a conventional B-mode imaging system is depicted in FIG. 1. An ultrasound transducer array 2 mounted on a rotatable support or plate 3 (indicated schematically) is activated to transmit an ultrasound beam focused at a transmit focal position. The return RF (radio frequency) signals produced by the transducer elements detecting the reflected ultrasound energy are dynamically focused at successive ranges along a scan line by a beamformer 4 to form a receive vector. The beamformer output data (I/Q or RF) for each scan line are passed through a B-mode processing chain 6 which includes equalization filtering, envelope detection and logarithmic compression. Depending on the scan geometry, up to several hundred vectors may be used to form a single acoustic image frame. To smooth the temporal transition from one acoustic frame to the next, some acoustic frame averaging 8 may be performed before scan conversion. For a sector scan, compressed images in $R\text{-}\theta$ format are converted by a scan converter 10 into X-Y format for display. On some systems, frame averaging 12 may be performed on the X-Y data rather than on the acoustic frames before scan conversion, and sometimes duplicate video frames may be inserted between acoustic frames in order to achieve a given video display frame rate. The scan-converted frames are passed to a video processor 14, which basically maps the scan-converted data to a display gray or color map for video display on a display monitor 18.

System control is centered in a host computer 20, which accepts operator inputs through an operator interface 22 and in turn controls the various subsystems. (In FIG. 1, the system control lines from the host computer to the various subsystems have been omitted for the sake of simplicity.) During imaging, a long sequence of the most recent images is stored and continuously updated automatically in a cine memory 16. Some systems are designed to save the $R\text{-}\theta$ acoustic images (this data path is indicated by the dashed line in FIG. 1), while other systems store the X-Y video images. The image loop stored in cine memory 16 can be reviewed on the display monitor via trackball control incorporated in operator interface 22, and a section of the image loop can be selected for hard disk storage.

For an ultrasound scanner with free-hand three-dimensional imaging capability, the selected image sequence stored in cine memory 16 is transferred to host computer 20 for three-dimensional reconstruction. The result is written back into another portion of the cine memory or to scan converter memory, from where it is sent to display system 18 via the video processor 14.

Figure 2:
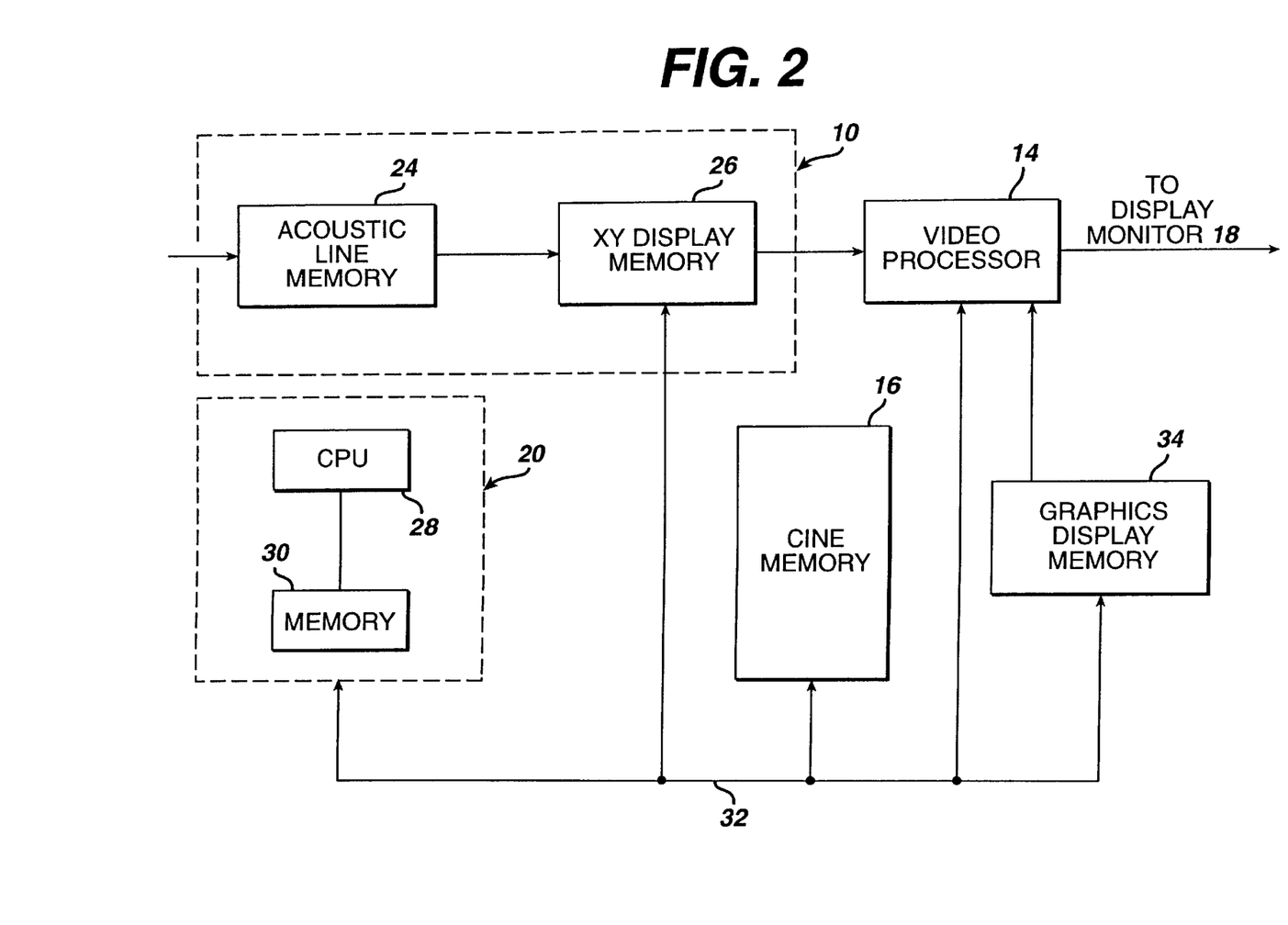
FIG. 2 is a block diagram of the means for reconstructing frames comprising successive volumetric projections of pixel data in accordance with a preferred embodiment of the present invention.

FIG. 2 shows scan converter 10 to comprise an acoustic line memory 24 and an XY display memory 26. The B-mode imaging data stored in polar coordinate ($R\text{-}\theta$) sector format in acoustic line memory 24 are transformed to appropriately scaled Cartesian coordinate intensity data which are stored in XY display memory 26. Each image frame from XY display memory 26 is sent to video processor 14. Before gray mapping, frames of B-mode imaging data in video processor 14 are stored in cine memory 16 on a first-in, first-out basis. Storage can be continuous or as a result of an external trigger event. Cine memory 16 operates in the manner of a circular image buffer that runs in the background, capturing image data that are displayed in real time to the user. Operation of an appropriate device on operator interface 22 (FIG. 1) to "freeze" the system adds the capability of viewing image data previously captured in cine memory.

The multiple frames of imaging data acquired during rotation of a transducer form a three-dimensional cylindrical data volume comprising a multiplicity of rotational scans or slices. When the selected image sequence stored in cine memory 16 is a cylindrical data volume, the rotational transducer scan data must be converted into a rectilinear coordinate system before volume rendering can be performed. In accordance with a preferred embodiment of the invention, the cylindrical data volume is converted to rectilinear coordinates by host computer 20 (or a dedicated processor) using the spatial coherency between appropriate rotational slices. The host computer retrieves the region of interest from cine memory 16 and uses the algorithm disclosed below to determine the horizontal and vertical rotational offsets. Once the offsets are known, the rotational transducer scan data can be converted to rectilinear coordinates and a volume rendering technique can be used to reconstruct images projected onto various imaging planes. The projected data resulting from each projection is written back into either another portion of the cine memory or to scan converter memory, from where it is sent to display monitor 18 via video processor 14.

Host computer 20 comprises a central processing unit (CPU) 28 and system memory 30. CPU 28 is programmed to transform an acquired cylindrical volume of imaging data into a multiplicity of three-dimensional projection images taken at different angles. The CPU controls the flow of data among XY display memory 26, video processor 14, cine memory 16 and the CPU itself, via a system control bus 32. Each frame of imaging data, representing one of a multiplicity of rotational scans or slices through the object being examined, is stored sequentially in acoustic line memory 24, in XY display memory 26 and in video processor 14. Before gray mapping, frames of B-mode imaging data are sent from the video processor to cine memory 16. A stack of frames, representing the scanned cylindrical object volume, is stored in cine memory 16, forming a cylindrical source data volume. Once the cylindrical source data volume has been acquired, CPU 28 can convert that data to rectilinear coordinates and then to three-dimensional projections of the data as well as arbitrary slices through the source data volume.

The conventional system has the capability to superimpose graphical symbols on any ultrasound image. The superimposition of graphics on the image frame is accomplished in video processor 14, which receives the ultrasound image frame from XY display memory 26 and the graphics data from a graphics display memory 34. The graphics data are processed and supplied to the graphics display memory by host computer 20 or by a dedicated graphics processor (not shown).

Figure 3:
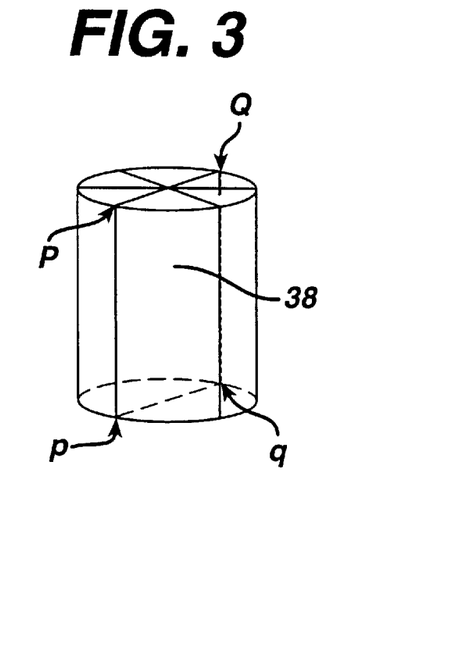
FIG. 3 is a schematic representation of a cylindrical volume swept by rotational transducer scans.
Figure 4:
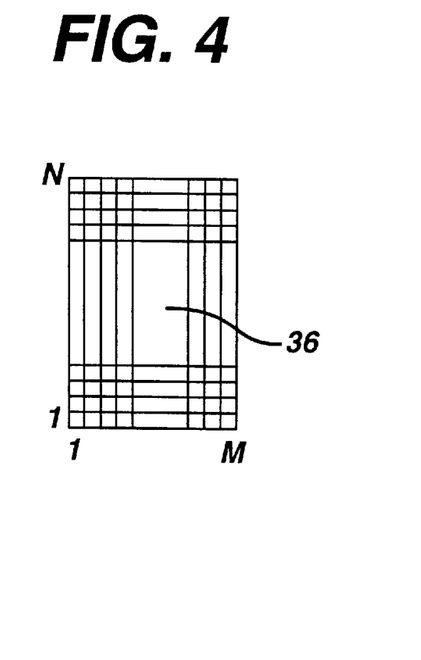
FIG. 4 is a schematic representation of a scan by a rotational transducer.
Figure 5:
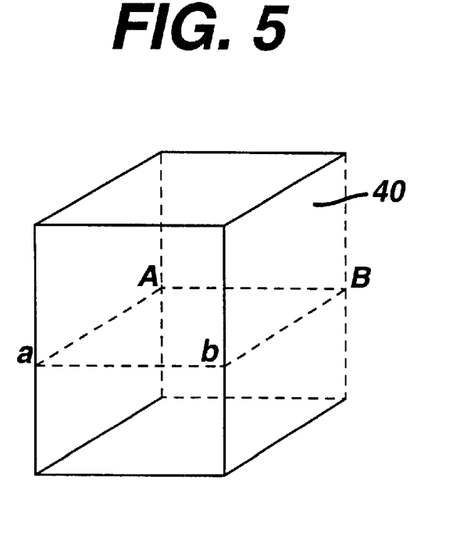
FIG. 5 is a schematic representation of a rectilinear volume swept by parallel transducer scans.
Figure 6:
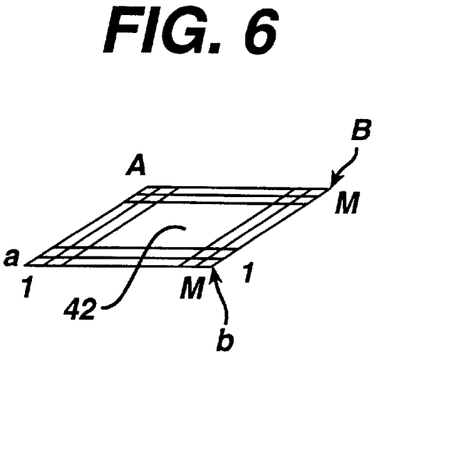
FIG. 6 is a schematic representation of one of the parallel transducer scans comprising the rectilinear volume shown in FIG. 5.

Rotational transducer scans are generated by a one-dimensional transducer array mounted on a rotating plate 3 (FIG. 1) having an axis of rotation perpendicular to the transducer array. The invention addresses the situation wherein the center of the transducer array is offset from the axis of rotation of the rotating plate. Each scan represents a two-dimensional data array 36, shown in FIG. 4, which is M elements wide and N elements high. The totality of scans for all rotational angles of the transducer sweeps a cylindrical volume 38, shown in FIG. 3. Various post-processing techniques usually deal with rectilinear structured grid sets. FIGS. 5 and 6, respectively, represent a three-dimensional rectilinear volume data set 40 and one of its two-dimensional horizontal slices 42. The slices are M elements wide and M elements deep. The volume is N elements high. The total amount of elements in the volume data set 40 is M×M×N. When converting from rotational slices to rectilinear coordinates, sampling over volume M×M×N need not be performed with the same sampling steps along rectilinear axes. However, without loss of generality, the same number of elements along horizontal rectilinear axes will be used as the number of elements in the rotational transducer.

Figure 7:
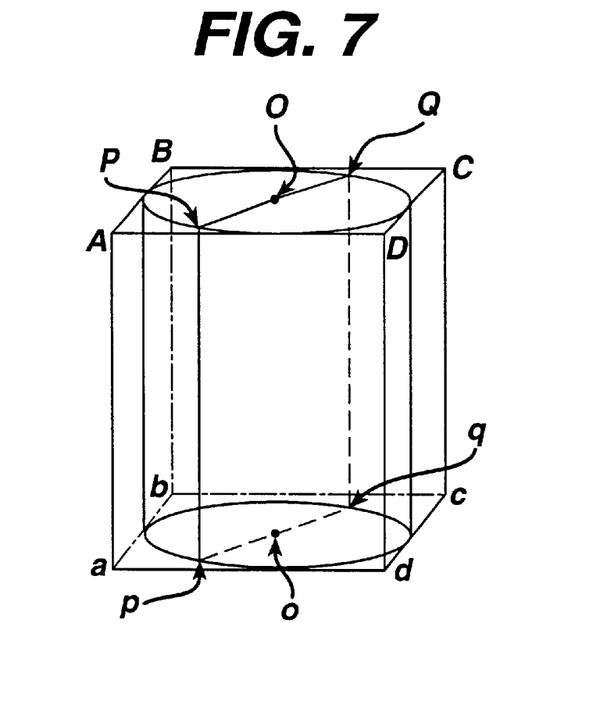
FIG. 7 is a schematic representation of a rectilinear volume overlapping a cylindrical volume.

The foregoing description is accurate only if the rotational axis passes through the center of the transducer since, in this instance, the cylindrical volume of data can be embedded into a rectilinear volume of data as shown in FIG. 7. One of the scanned images is represented by pPQq. The bottom rectilinear scan is abcd and the top rectilinear scan is ABCD. The axis of rotation is oO.

Figure 8:
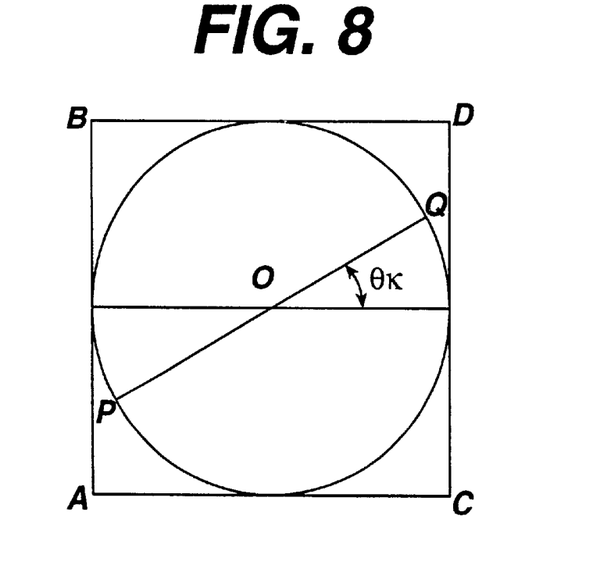
FIG. 8 is a schematic representation of a view orthogonal to the rotational transducer scans.
Figure 9:
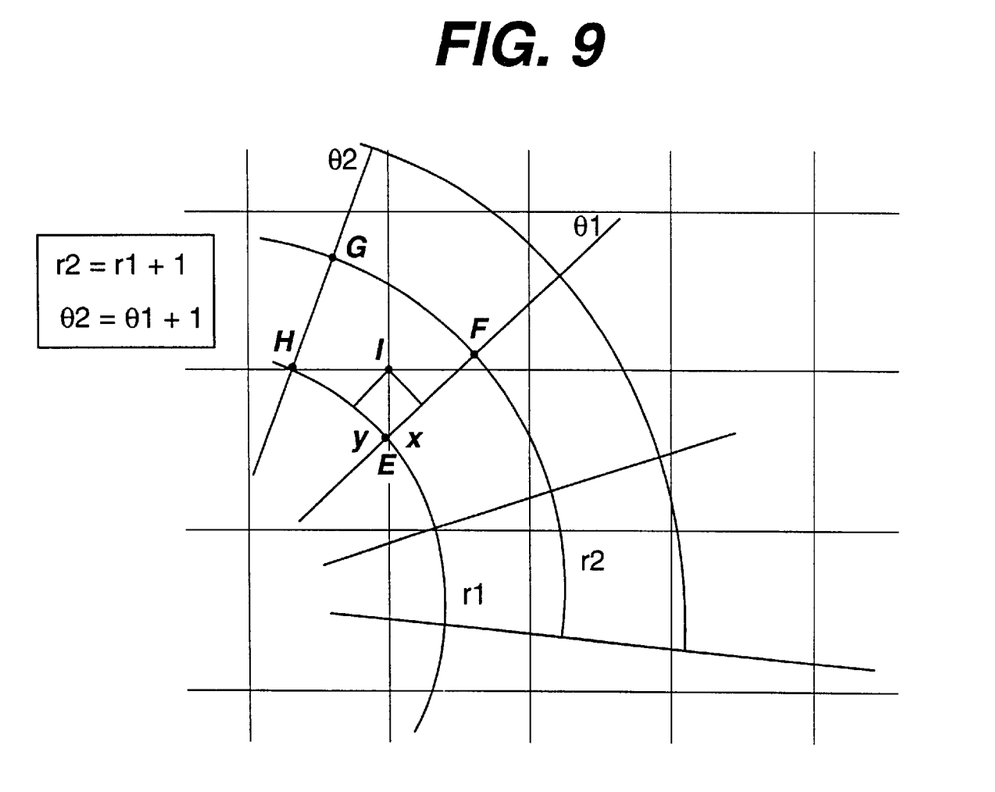
FIG. 9 is a schematic illustration of two overlapping coordinate grids in a plane orthogonal to the rotational transducer scans: one induced by rotational scans and the other induced by parallel scans.

FIG. 8 is a top view of the volume of FIG. 7. It can be assumed, without loss of generality, that the number of rotational scans is 180, with each pair of consecutive scans being spaced by 1°. The method described herein applies equally to data scans spaced by an arbitrary number of degrees. Conversion from a cylindrical data volume to a rectilinear data volume can be achieved by the algorithm shown in FIG. 10. FIG. 9 illustrates the meaning of some of the variables used in the algorithm of FIG. 10. The cylindrical and rectilinear grids are superimposed, one on top of the other, in FIG. 9. Rotational scans are represented by straight radial lines θ1 and θ2=θ1+1. Consecutive elements in the scan are shown as circular arcs r1 and r2=r1+1. FIG. 9 illustrates one horizontal slice of the volume and therefore all other horizontal slices will have the same structure. The task of transforming cylindrical data array (θ,r,z) to a rectilinear data array (X,Y,Z) is therefore reduced to finding, for each element of rectilinear array I (see FIG. 9), its neighbors E,F,G,H in the cylindrical grid and calculating the intensity value in location I given the intensity values in locations E,F,G,H. For convenience of the exposition, the words "scan" and "slice" will be used interchangeably. Real numbers x and y in FIGS. 9 and 10 correspond to the offsets along line θ1 and arc EH of point I relative to point E.

Figure 10:
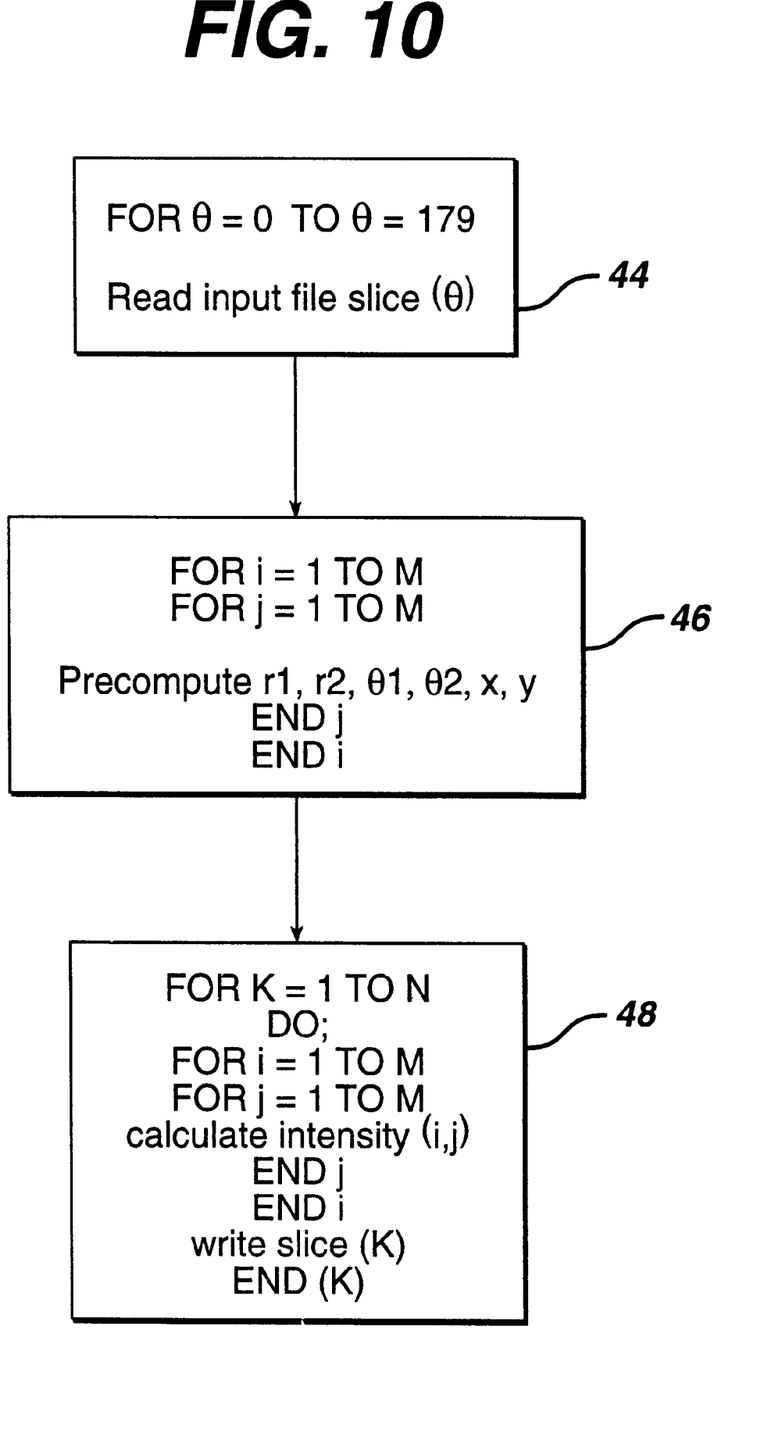
FIG. 10 is a flowchart of a method for converting acquired data from a rotational to a rectilinear coordinate system.

Referring to FIG. 10, the host computer, at step 44, reads the rotational slices stored in cine memory for θ=0 to θ=179. The algorithm of FIG. 10 takes advantage of the similarity between all horizontal slices and therefore, at step 46, calculates r1,r2,θ1,θ2,x,y only once for each vertical scan line (i,j,k=1, . . . , N). At step 48, the function Calculate Intensity(i,j) may use a bilinear interpolation method for calculating an interpolated intensity value at point (i,j) from intensity values at points E,F,G,H. Other interpolation techniques can alternatively be applied.

Figure 11:
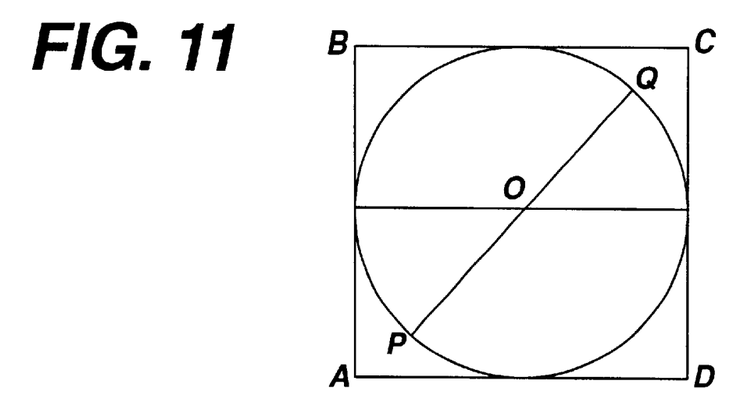
FIGS. 11–13 are schematic representations of views orthogonal to the rotational transducer scans in the following instances: zero offsets (FIG. 11); negative horizontal offset (using a right-handed coordinate system and treating counterclockwise rotations as being in the positive direction) (FIG. 12); and positive horizontal offset (FIG. 13).
Figure 12:
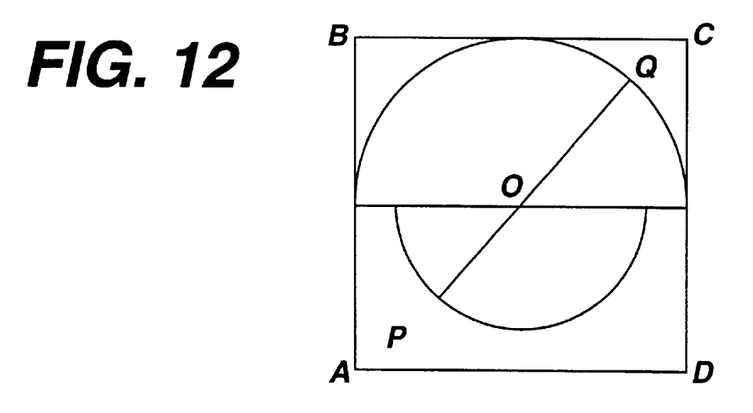
Figure 13:
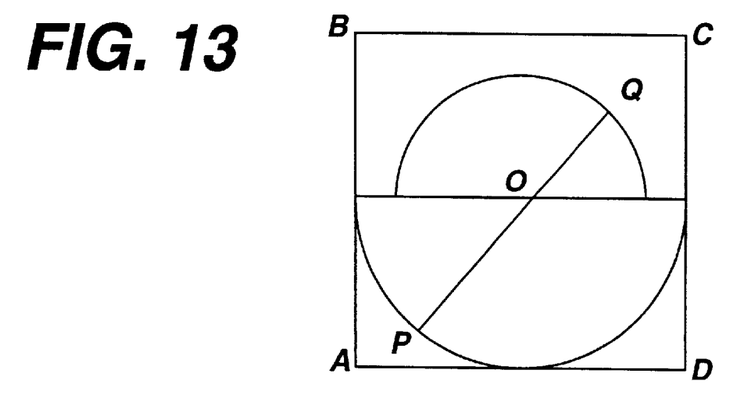

In practice, the algorithm of FIG. 10 can only be applied if the axis of rotation goes through the center of the transducer array. The offset of the axis relative to the array center can be specified by two numbers, offset_x and offset_y, in the right-handed coordinate system centered at the transducer center, the X axis being aligned with the initial position of the transducer (θ=0) and the Y axis being perpendicular to the X axis. FIGS. 11–13 illustrate various combinations of possible offsets. In FIG. 11 offset_x=offset_y=0; in FIG. 12 offset_y=0, offset_x<0; in FIG. 13 offset_y=0, offset_x>0; and in FIG. 14 offset_y<0, offset_x<0. It is simple to deduce the appearance of similar drawings in the following instances: a) offset_x<0, offset_y>0; b) offset_x>0, offset_y<0; and c) offset_x>0, offset_y>0.

Figure 14:
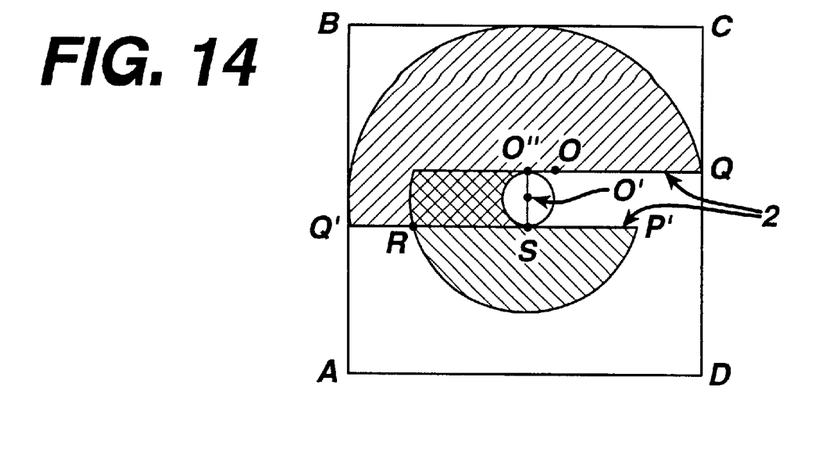
FIG. 14 is a schematic illustration of a view orthogonal to the rotational transducer scans in the presence of negative horizontal and negative vertical offsets.

FIG. 14 depicts the area swept by a transducer array 2 mounted on a rotatable support having a center of rotation O', wherein the center of the array O is offset both horizontally and vertically relative to the center of rotation. The area O"PRS is swept twice, while areas RPQQ' and RSP'R are swept once and the rest of the square ABCD is not swept at all.

Figure 15:
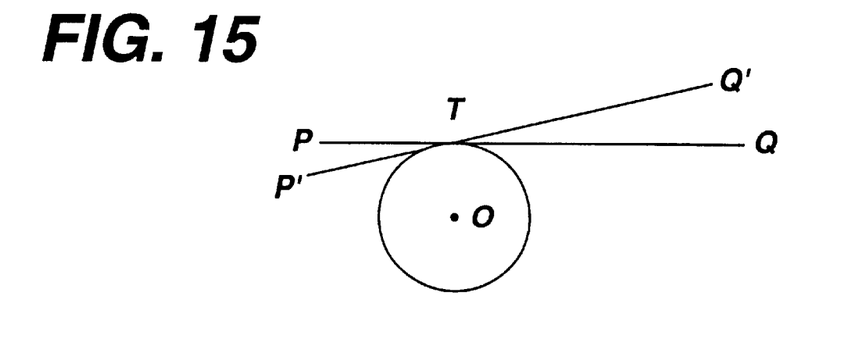
FIGS. 15 and 16 are schematic illustrations of the geometric construction necessary for the calculation of a horizontal offset.
Figure 16:
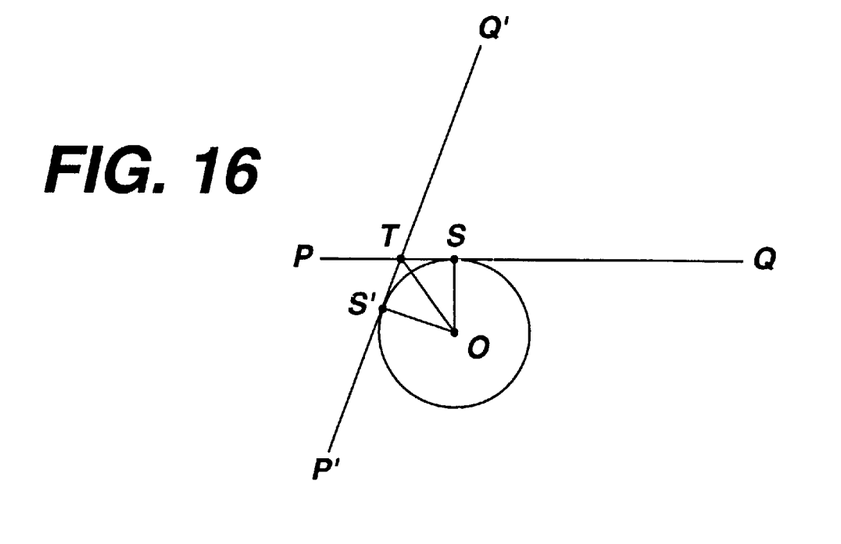
Figure 17:
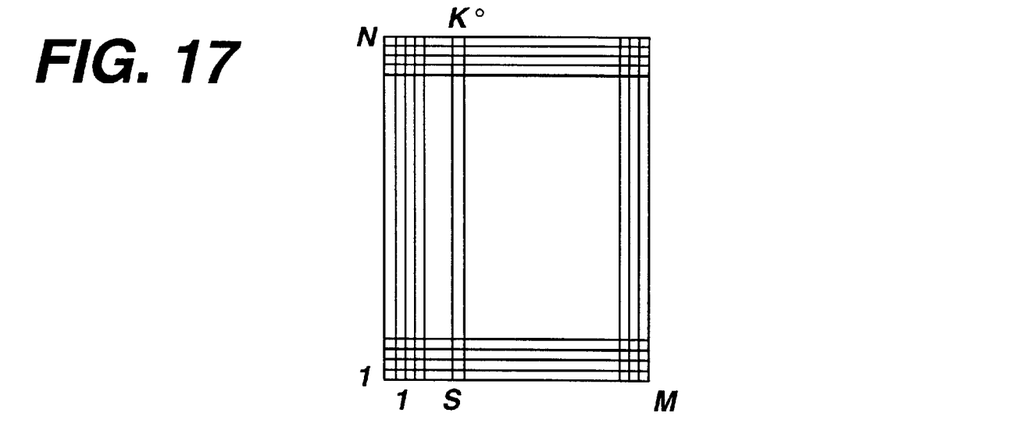
FIGS. 17 and 18 are schematic representations of two consecutive rotational transducer scans.
Figure 18:
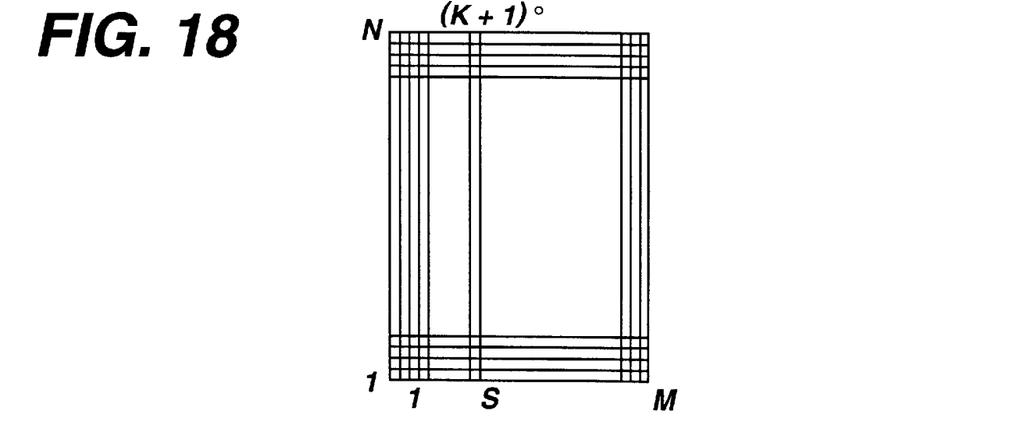

In accordance with a preferred embodiment of the invention, the procedure for computing offset_x is as follows. In FIG. 15, the lines PQ and P'Q' represent top views of two consecutive rotational transducer scans. FIG. 16 shows the center of rotation O, projection S of center of rotation O on scan PQ and projection S' of center of rotation O on scan P'Q'. FIGS. 15 and 16 also show the intersection T of these two scans. For two consecutive scans, distances ST and S'T, shown in FIG. 16, will be negligibly small (they are equal as follows from geometry). Also, distance PS is equal to distance P'S' from the definition of O as the rotational center. Therefore distance PT can be assumed to be approximately equal to distance P'T. Since T is a point shared by two rotational transducer scans, a scan line passes through T perpendicular to the plane of the illustration and is shared by those two rotational transducer scans. Therefore, a comparison of the data in two scan lines S in two consecutive scans (vertical scan lines S in both scans shown in FIGS. 17 and 18), will show one value S, $1 \leq S \leq M$, for which these two data arrays will be most correlated (the presence of noise prevents these data arrays from being equal, even if they represent scan data for one and the same line in physical space). Here any correlation function can be used. For two data arrays $X=(x_1, \ldots, x_n)$, $Y=(y_1, \ldots, y_n)$, the formula $$Corr(X, Y) = \frac{\sum_{i=1,n}(x_i - \bar{x})(y_i - \bar{y})}{\sqrt{\sum_{i=1,n}(x_i - \bar{x})^2} \sqrt{\sum_{i=1,n}(y_i - \bar{y})^2}}$$

can be used.

Figure 19:
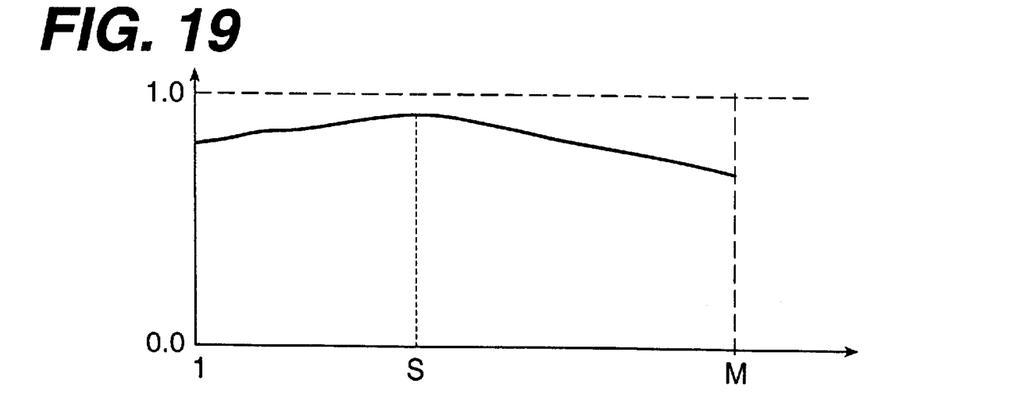
FIG. 19 is a graph of the correlation function between corresponding vertical scan lines in two consecutive rotational transducer scans.

The graph of FIG. 19 shows the generic view of this correlation coefficient as a function of scan line number S. In this instance, X is the vertical scan line number S in the scan k and Y is the vertical scan line number S in the scan (k+1), k=1 to 178. For each number k, S(k,k+1) is computed as a scan line number which maximizes the correlation coefficient. For multiple maxima, there are several choices: a) take the minimum of those S maximizing correlation; b) take the maximum of S; and c) take average of S. For example, if the total number of vertical scan lines in each scan were 11, then using method a) for a list of correlation coefficients {0.2 0.3 0.2 0.2 0.4 0.5 0.8 0.8 0.7 0.6 0.4} for scan lines 1 to 11 in scans 5 and 6, S(5,6)=7 is first computed. Then the average of all such S(k,k+1) is computed:

$$\hat{S} = \frac{1}{178}\sum_{k=1}^{178} S(k, k+1)$$

The offset_x can be computed then by the formula offset_x=Ŝ-M/2.

Figure 20:
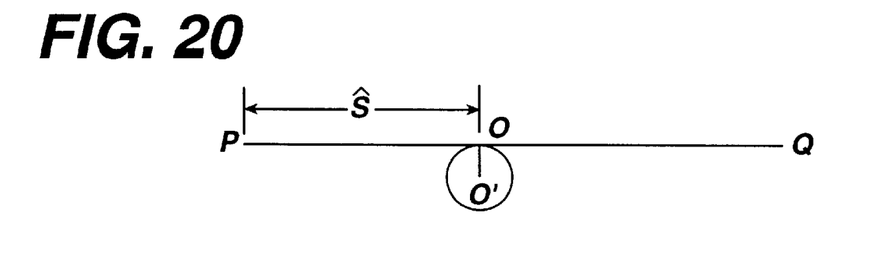
FIG. 20 is a schematic representation of both horizontal and vertical non-zero offsets.
Figure 21:
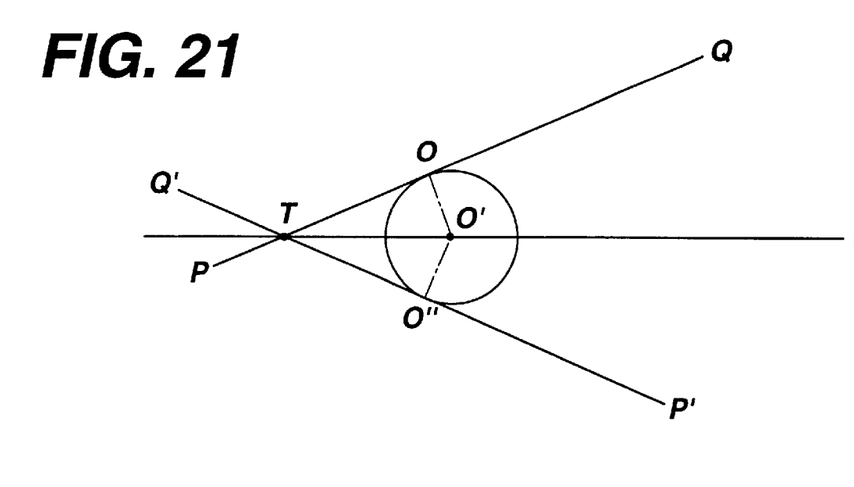
FIG. 21 is a schematic representation of the geometric construction necessary for calculation of a vertical offset.
Figure 22:
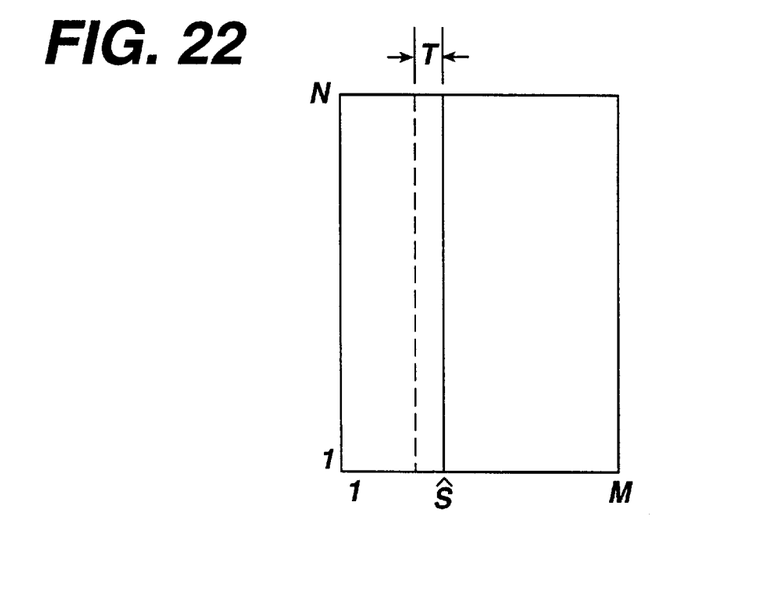
FIGS. 22 and 23 are schematic representations of two rotational transducer scans corresponding to slices PQ and P'Q', respectively, in FIG. 21.
Figure 23:
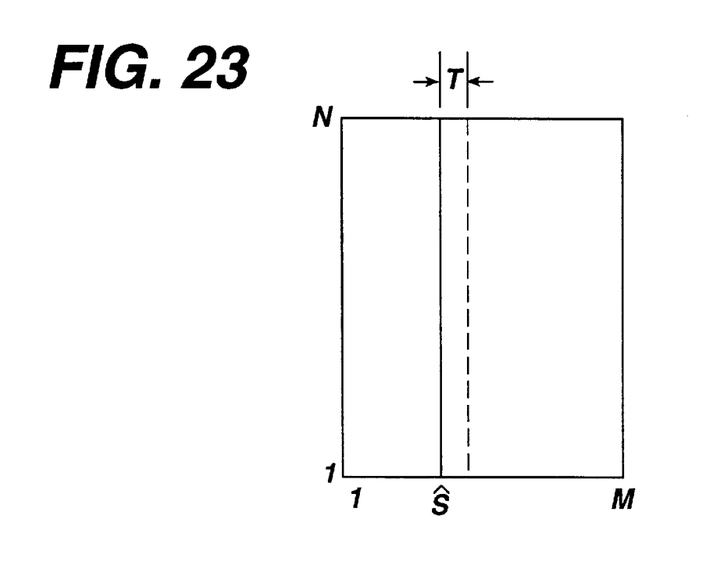
Figure 24:
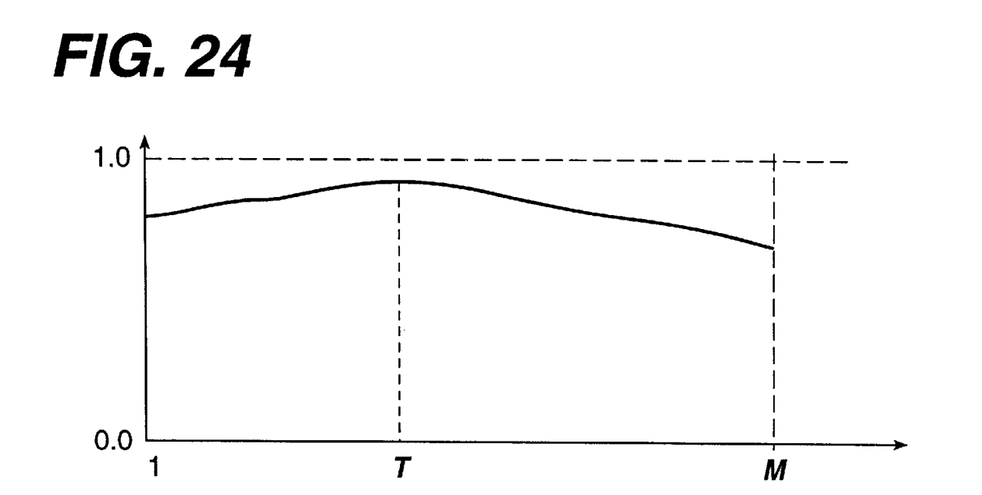
FIG. 24 is a graph of the correlation function between vertical scan lines in two conjugate slices (PQ and P'Q').

To compute offset_y, a preferred embodiment utilizes the coherency between far-spaced scans. The doubly cross-hatched area in FIG. 14 represents area swept twice: once by the leftmost part PO" and once by the rightmost part O"Q of the transducer array. FIG. 20 shows that the sought offset is equal to the distance O'O. For all the points T of the doubly cross-hatched area of FIG. 14 lying at the same horizontal level as 0', two slices PQ and P'Q' are found intersecting at T (see FIG. 21). If slice PQ has scan number k, then slice P'Q' will have scan number (180−k), since ∠QTO'=∠O'TP'. Knowing that P'O"=PO=Ŝ, then P'T=Ŝ+O"T and PT=Ŝ−OT. The fact that OT=TO" leads to the following algorithm for computing offset_y. Defining slices number k and number (180−k) as conjugate slices, then for all conjugate pairs of slices, a correlation coefficient can be computed for the vertical scan line Ŝ−OT in slice k shown schematically in FIG. 22, and the vertical scan line Ŝ+OT in slice (180−k) shown schematically in FIG. 23. A graph for this correlation coefficient as a function of OT for all possible values of OT can be plotted as shown in FIG. 24. Since the diagram of FIG. 14 represents one of four different combinations of signs of offset_x and offset_y, the value of offset OT (T in FIGS. 21 and 22) should be allowed to be both positive and negative, with the condition that it has an opposite sign in the conjugate slice. As previously with offset_x, the offset is selected that maximizes the correlation coefficient. Now, if offset OT corresponds to the maximum correlation coefficient, then for the pair of conjugate slices k and (180−k)

O'O"(k)=O"T *tan(k°)

The final value of offset_y will be equal to $$\textit{offset\_y} = \text{sign}(OT)\frac{1}{\text{Number of }(k)}\sum_k O'O''(k)$$

In accordance with a preferred embodiment of the invention, the horizontal and vertical offsets are calculated by the host computer based on rotational transducer scan data stored in memory. Although the host computer may calculate the offsets based on scan converted data, it is preferred that the host computer process the scan data before scan conversion. Taking the calculated offsets into account, the host computer transforms the data from the rotational transducer scans to a rectilinear coordinate system using the algorithm of FIG. 10 with the appropriate offset adjustments for correct calculation of r1,r2,θ1,θ2,x,y. When the scan data have been converted to rectilinear coordinates, the host computer uses a conventional volume rendering technique to form three-dimensional projection images for display.

Alternatively, the offset information computed using the foregoing method can be used in the transducer manufacturing process to position a transducer array exactly at the rotational axes. This aspect of the invention encompasses a method of manufacturing a rotational transducer comprising the steps of: (a) mounting a transducer array on a rotatable support; (b) coupling the transducer array to an ultrasound scan data acquisition system, including at least the transmit and receive beamformers and signal processing of an ultrasound imaging system; (c) performing rotational transducer scans of a phantom object to acquire scan data in cylindrical coordinates; (d) calculating offsets corresponding to distances by which the center of the transducer array is displaced from the center of rotation of the rotatable support; and (e) repositioning the transducer array on the rotatable support at a new position displaced from the initial position by the amount of the calculated offsets.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An imaging system comprising:
   a rotatable transducer array comprising transducer elements for transmitting wave energy in response to electrical activation and transducing returned wave energy into electrical signals, said transducer array having a center;
   a rotatable support for said transducer array, said rotatable support having a center of rotation;
   a beamformer coupled to said transducer array and programmed to activate a plurality of said transducer elements to transmit focused wave energy for each of a multiplicity of transmit focal positions along scan lines that make up each of a plurality of scan planes and to form receive signals from electrical signals produced by said plurality of transducer elements subsequent to each transmit for each scan line in each of said scan planes, said scan lines being generated by rotational scans of said transducer array;
   a processing subsystem for converting said receive signals into pixel data for each scan line in each of said scan planes;
   a memory for storing a respective slice of pixel data for each of said scan planes to form a data volume;
   a computer for calculating offset data representing an estimated distance by which said center of said transducer array is displaced from said center of rotation of said rotatable support, converting the pixel data of said data volume to rectilinear coordinates taking the calculated offset data into account, and projecting the pixel data of said data volume in rectilinear coordinates to form projected image data, said computer comprising means for calculating a first offset along a first rectilinear coordinate direction and means for calculating a second offset along a second rectilinear coordinate direction perpendicular to said first rectilinear coordinate direction; and
   a subsystem for displaying a projected image which is a function of said projected image data.

2. The system as recited in claim 1, wherein said means for calculating a first offset includes:
   means for calculating correlation coefficients for respective scan lines of each pair of rotational scans of said transducer array having scan numbers k and (k+1), where k varies from 1 to K and K is the total number of scans minus 1;
   means for determining a scan line number S(k,k+1) corresponding to a maximum correlation coefficient for each scan number k; and means for calculating an average $\hat{S}$ of all S(k,k+1) from k=1 to K;

wherein said first offset is calculated in accordance with the formula offset_x=$\hat{S}$−M/2, where M is the number of scan lines in each rotational transducer array scan.

3. The system as recited in claim 2, wherein said means for calculating a second offset includes:

means for calculating correlation coefficients for a vertical scan line $\hat{S}$−OT in scan k and a vertical scan line $\hat{S}$+OT in a scan conjugate to scan k for each pair of conjugate rotational transducer array scans, where line segment OT is defined by a point T where said pair of conjugate scans intersect and point O where a line OO' perpendicular to scan k and intersecting said center of rotation O' intersects scan k; and means for determining a value for OT corresponding to a maximum correlation coefficient for each said pair of conjugate scans;

wherein said second offset is calculated as a function of said value for OT corresponding to a maximum correlation coefficient.

4. The system as recited in claim 3, wherein said computer is adapted to additionally take said first and second offsets into account when converting the pixel data of said data volume to rectilinear coordinates.

5. The system as recited in claim 1, wherein said transducer elements comprise piezoelectric transducing elements which transduce applied electrical energy into ultrasound wave energy and transduce applied ultrasound wave energy into electrical energy.

6. A method for three-dimensional imaging of a volume of matter, comprising the steps of:

transmitting focused wave energy from a transducer array mounted on a rotatable support for each of a multiplicity of transmit focal positions in each of a multiplicity of scan planes intersecting the volume of matter, each of said scan planes being rotated relative to a preceding scan plane;

generating electrical receive signals from echoes of wave energy returned from the volume of matter following each transmit for each of a multiplicity of scan lines in each of said scan planes;

converting said receive signals into pixel data for each scan line in each of said scan planes;

storing a respective slice of pixel data for each of said scan planes to form a data volume;

calculating offset data representing an estimated distance by which a center of said transducer array is displaced from a center of rotation of said rotatable support, wherein calculating offset data comprises the steps of calculating a first offset along a first rectilinear coordinate direction and calculating a second offset along a second rectilinear coordinate direction perpendicular to said first rectilinear coordinate direction;

converting the pixel data of said data volume to rectilinear coordinates taking the calculated offset data into account;

projecting the pixel data of said data volume in rectilinear coordinates to form projected image data; and displaying a projected image as a function of said projected image data.

7. The method as recited in claim 6, wherein the step of calculating a first offset comprises the steps of:

calculating correlation coefficients for respective scan lines of each pair of rotational transducer scans having scan numbers k and (k+1), where k varies from 1 to K and K is the total number of scans minus 1;

determining a scan line number S(k,k+1) corresponding to a maximum correlation coefficient for each scan number k;

calculating an average $\hat{S}$ of all S(k,k+1) from k=1 to K; and calculating said first offset in accordance with the formula offset_x=$\hat{S}$−M/2, where M is the number of scan lines in each scan.

8. The method as recited in claim 7, wherein the step of calculating a second offset comprises the steps of:

calculating correlation coefficients for a vertical scan line $\hat{S}$−OT in scan k and a vertical scan line $\hat{S}$+OT in a scan conjugate to scan k for each pair of conjugate rotational transducer array scans, where line segment OT is defined by a point T where said pair of conjugate scans intersect and point O where a line OO' perpendicular to scan k and intersecting said center of rotation O' intersects scan k;

determining a value for OT corresponding to a maximum correlation coefficient for each said pair of conjugate scans; and calculating a second offset as a function of said value for OT corresponding to a maximum correlation coefficient.

9. The method as recited in claim 8, wherein the step of converting the pixel data of said data volume to rectilinear coordinates takes said first and second offsets into account.

10. A system for three-dimensional imaging of an object volume, comprising:

a rotatable transducer array comprising transducer elements for transmitting wave energy in response to electrical activation and transducing returned wave energy into electrical signals, said transducer array having a center;

a rotatable support (3) for said transducer array, said rotatable support having a center of rotation;

a display monitor; and a computer programmed to perform the steps of:
(a) activating transducer elements of said array to transmit focused wave energy for each of a multiplicity of transmit focal positions along scan lines that make up each of a multiplicity of scan planes;
(b) forming receive signals from electrical signals produced by said plurality of transducer elements subsequent to each transmit for each of a multiplicity of scan lines in each of said scan planes;
(c) converting said receive signals into pixel data for each scan line in each of said scan planes;
(d) storing a respective slice of pixel data for each of said scan planes to form a data volume;
(e) calculating offset data representing an estimated distance by which a center of said transducer array is displaced from said center of rotation of said rotatable support, wherein calculating offset data comprises the steps of calculating a first offset along a first rectilinear coordinate direction and calculating a second offset along a second rectilinear coordinate direction perpendicular to said first rectilinear coordinate direction;
(f) converting the pixel data of said data volume to rectilinear coordinates taking the calculated offset data into account;
(g) projecting the pixel data of said data volume in rectilinear coordinates to form projected image data; and (h) controlling said display monitor to display a projected image which is a function of said projected image data.

11. The system as recited in claim 10, wherein the step of calculating a first offset comprises the steps of:

calculating correlation coefficients for respective scan lines of each pair of rotational scans of said transducer array having scan numbers k and (k+1), where k varies from 1 to K and K is the total number of scans minus 1;

determining a scan line number S(k,k+1) corresponding to a maximum correlation coefficient for each scan number k;

calculating an average $\hat{S}$ of all S(k,k+1) from k=1 to K; and calculating said first offset in accordance with the formula offset_x$\hat{S}$–M/2, where M is the number of scan lines in each rotational transducer array scan.

12. The system as recited in claim 11, wherein the step of calculating a second offset comprises the steps of:

calculating correlation coefficients for a vertical scan line $\hat{S}$–OT in scan k and vertical scan line $\hat{S}$+OT in the scan conjugate to scan k for each pair of conjugate rotational transducer array scans, where line segment OT is defined by a point T where said pair of conjugate scans intersect and point O where a line OO' perpendicular to scan k and intersecting said center of rotation O' intersects scan k;

determining a value for OT corresponding to a maximum correlation coefficient for each said pair of conjugate scans; and calculating a second offset as a function of said value for OT corresponding to a maximum correlation coefficient.

13. The system as recited in claim 12, wherein the step of converting the pixel data of said data volume to rectilinear coordinates takes said first and second offsets into account.

14. The system as recited in claim 10, wherein said transducer elements comprise piezoelectric transducing elements that transduce applied electrical energy into ultrasound wave energy and transduce applied ultrasound wave energy into electrical energy.

15. A method of manufacturing a rotational transducer array comprising the steps of:

(a) mounting a transducer array at an initial position on a rotatable support;

(b) coupling the transducer array to an ultrasound scan data acquisition system;

(c) performing rotational transducer scans of a volume of matter to acquire scan data in cylindrical coordinates;

(d) employing the acquired scan data to calculate offset data representing an estimated distance by which the center of the transducer array is displaced from the center of rotation of the rotatable support; and (e) repositioning the transducer array on the rotatable support at a new position displaced from the initial position by the amount of the calculated offset.

16. The method as recited in claim 15, wherein the step of employing the acquired scan data to calculate offset data comprises employing the acquired scan data to calculate a first offset along a first coordinate direction and a second offset along a second coordinate direction perpendicular to said first coordinate direction.

17. The method as recited in claim 16, wherein the step of employing the acquired scan data to calculate a first offset comprises the steps of:

calculating correlation coefficients for respective scan lines of each pair of rotational scans of said transducer array having scan numbers k and (k+1), where k varies from 1 to K and K is the total number of scans minus 1;

determining a scan line number S(k,k+1) corresponding to a maximum correlation coefficient for each scan number k;

calculating an average $\hat{S}$ of all S(k,k+1) from k=1 to K; and calculating said first offset in accordance with the formula offset_x=$\hat{S}$–M/2, where M is the number of scan lines in each rotational transducer array scan.

18. The method as recited in claim 17, wherein the step of employing the acquired scan data to calculate a second offset comprises the steps of:

calculating correlation coefficients for a vertical scan line $\hat{S}$–OT in scan k and a vertical scan line $\hat{S}$+OT in a scan conjugate to scan k for each pair of conjugate rotational transducer array scans, where line segment OT is defined by a point T where said pair of conjugate scans intersect and point O where a line OO' perpendicular to scan k and intersecting said center of rotation O' intersects scan k;

determining a value for OT corresponding to a maximum correlation coefficient for each said pair of conjugate scans; and calculating a second offset as a function of said value for OT corresponding to a maximum correlation coefficient.

* * * * *